United States Patent [19]

Snider

[11] Patent Number: 5,582,067

[45] Date of Patent: Dec. 10, 1996

[54] INTEGRAL ROTARY DRIVE MECHANISM

[75] Inventor: Chris R. Snider, Kokomo, Ind.

[73] Assignee: Delco Electronics Corporation, Kokomo, Ind.

[21] Appl. No.: 520,358

[22] Filed: Oct. 25, 1995

[51] Int. Cl.⁶ .................................................. F16H 21/24
[52] U.S. Cl. ........................ 74/109; 74/422; 74/DIG. 10
[58] Field of Search ...................... 74/109, 422, DIG. 10

[56] References Cited

U.S. PATENT DOCUMENTS

| 3,018,669 | 1/1962 | Bennett | 74/109 |
| 3,428,996 | 1/1967 | Carpenter | 15/250.24 |
| 3,779,091 | 12/1973 | Inoue | 74/109 |
| 4,794,847 | 1/1989 | Kreuter | 74/109 |

*Primary Examiner*—Charles A. Marmor
*Assistant Examiner*—David Fenstermacher
*Attorney, Agent, or Firm*—Jimmy L. Funke

[57] ABSTRACT

A gear and a rack attached to the gear periphery are molded in one piece. A housing recess contains the gear and a channel accommodates the rack so that, as the gear is turned by a knob, the rack is driven by the gear so that it wraps or unwraps about the gear and a free end of the rack moves along the channel. The channel is linear or curved to determine the direction of motion of the free end. A cable or other device is controlled by the free end of the rack.

8 Claims, 2 Drawing Sheets

5,582,067

INTEGRAL ROTARY DRIVE MECHANISM

FIELD OF THE INVENTION

This invention relates to apparatus for translating rotary motion to linear motion and particularly to a rotary drive mechanism having a one-piece gear and rack.

BACKGROUND OF THE INVENTION

Control actuators such as for automotive comfort controls are typically an assembly of several parts having the purpose of translating a rotary input to a linear output. For example, mode and temperature control knobs are typically connected via levers and/or cams with followers, or even gears to Bowden cables which open or close doors in the heater, evaporator and blower assembly. Generally two or more movable components are required to transfer the rotary input to a linear output. To simplify controls and to reduce the costs of components and assembly, it is desirable to minimize the number of components required to carry out the control function.

SUMMARY OF THE INVENTION

It is therefore an object of the invention to change rotary motion in a control actuator to substantially linear motion with a minimum of parts.

A one-piece molded gear and rack combination includes a gear hub and input shaft on the gear. The rack is connected at one end to the gear periphery and is flexible so that it can wrap around the gear upon gear rotation in one direction and unwrap in the other direction. The gear and rack have complementary meshing teeth so that gear torque is transferred to the rack. A housing supports the gear for rotation and includes a channel which receives and guides the rack so that its free end moves linearly, or in an arc. The free end is coupled to a Bowden wire, for example, for actuation of a remote device. The channel may be straight or it may curve to change the direction of motion. A knob on the input shaft turns the gear to effect the rack motion.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

While the drive mechanism was developed for use in heater/air conditioner controls in motor vehicles, it has applications wherever rotary motion of a control actuator is to be converted to linear or arcuate motion for operation of a utilization device.

Figure 1:
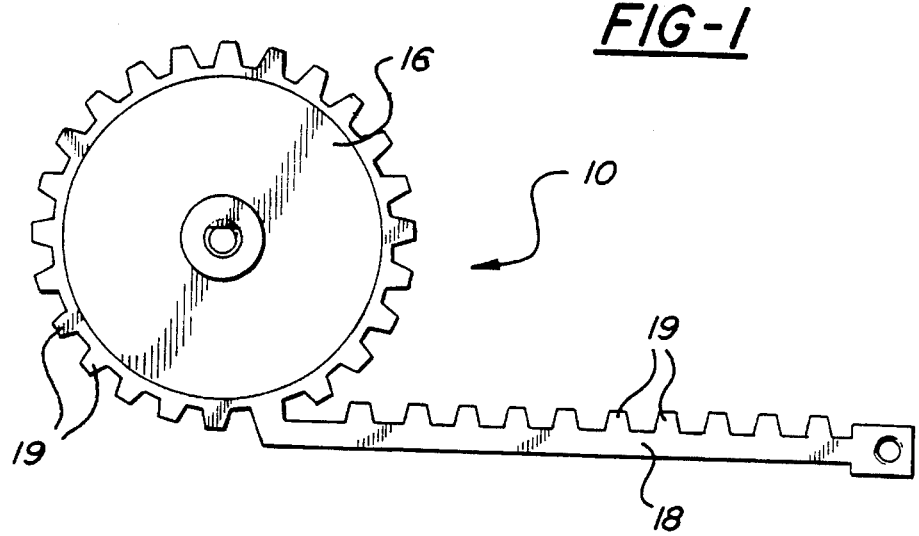
FIG. 1 is a side view of a one-piece gear and rack for a rotary drive mechanism, according to the invention.
Figure 2:
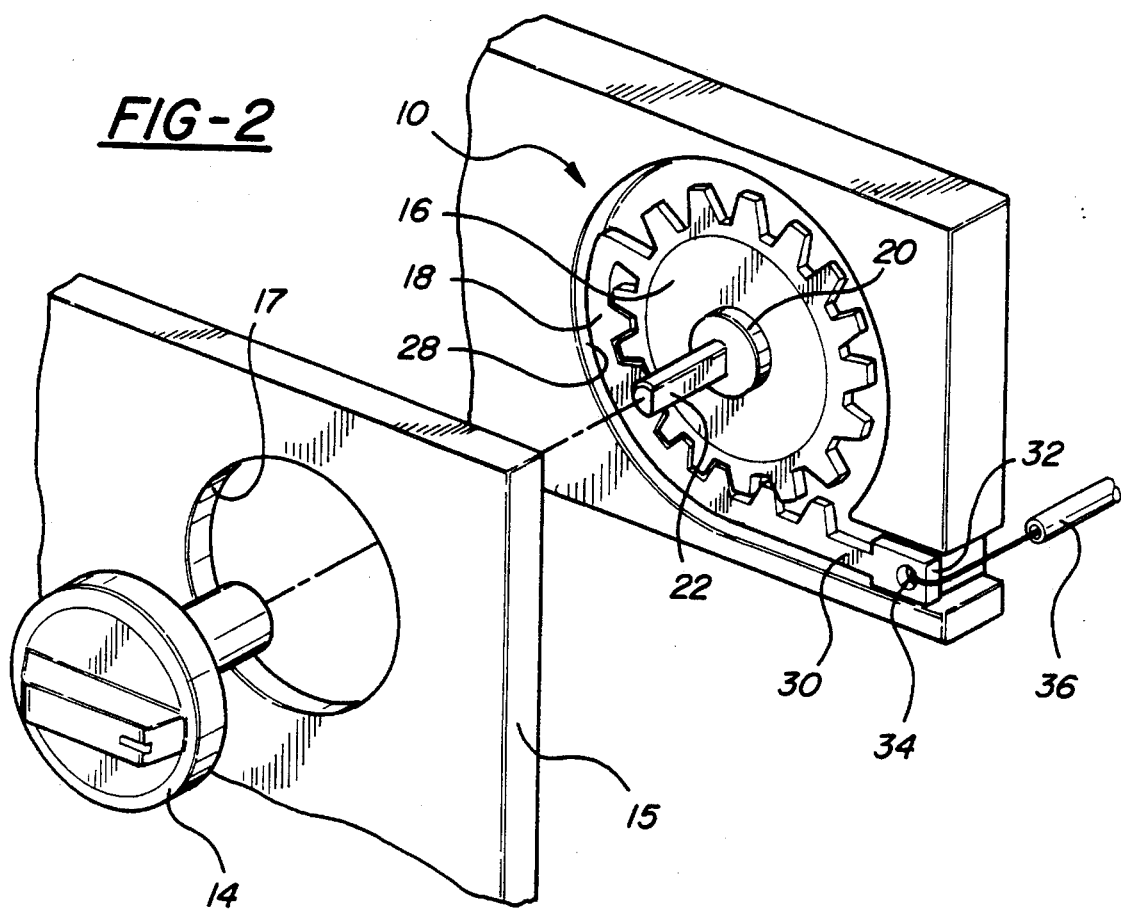
FIG. 2 is an exploded view of a rotary drive mechanism including the gear and rack of FIG. 1.

As shown in FIGS. 1 and 2, a drive mechanism comprises an integral gear and rack 10 mounted for rotation in a housing 12 and operated by an actuator or control knob 14.

A trim plate 15 covers the gear and rack 10 and has an aperture 17 to permit coupling between the gear and the knob. The gear and rack 10 is molded as one piece and includes a rotor or gear 16 and a rack 18 having complementary drive means comprising teeth 19 on each member for meshing with the other. As shown, the teeth 19 extend across the width of the gear and the rack. The rack 18 is a flexible elongated member and one end of the rack connects to the outer periphery of the gear 16. A material such as nylon is used to mold the rack and gear to afford both the flexibility needed for the rack and hardness for structural integrity.

The gear 16 has an integral hub 20 (best shown in FIG. 3) defining a gear axis and a shaft 22 on the axis with a flat for drivingly receiving the knob 14. The hub 20 has a bifurcated end with outwardly extending locking tabs 24 for snapping into a hole 26 in the housing 12. The hole 26 supports the gear hub 20 for rotation. A circular recess 28 in the housing receives the gear 16 and allows sufficient clearance between the gear and the recess wall to accommodate the rack 18.

The rack 18 wraps around the gear and unwraps according to gear rotation. An "unwrapped" or free portion 30 of the rack extends in a line tangential to the gear. A channel 32 in the housing 12 contains the free portion 30 of the rack to guide the rack in a fixed path. The free end 34 of the rack has a hole or other attachment device for connection to the center wire of a Bowden cable 36 or to some other device to be moved upon rotation of the knob.

In operation, since the teeth 19 of the gear 16 and rack 18 mesh, the free end 34 of the rack will move in the channel 32 whenever the knob 14 turns the gear. The free end will extend or retract to operate the Bowden cable. In the case of a linear channel as in FIG. 2, the free portion 30 and the free end 34 will follow a linear path.

Figure 3:
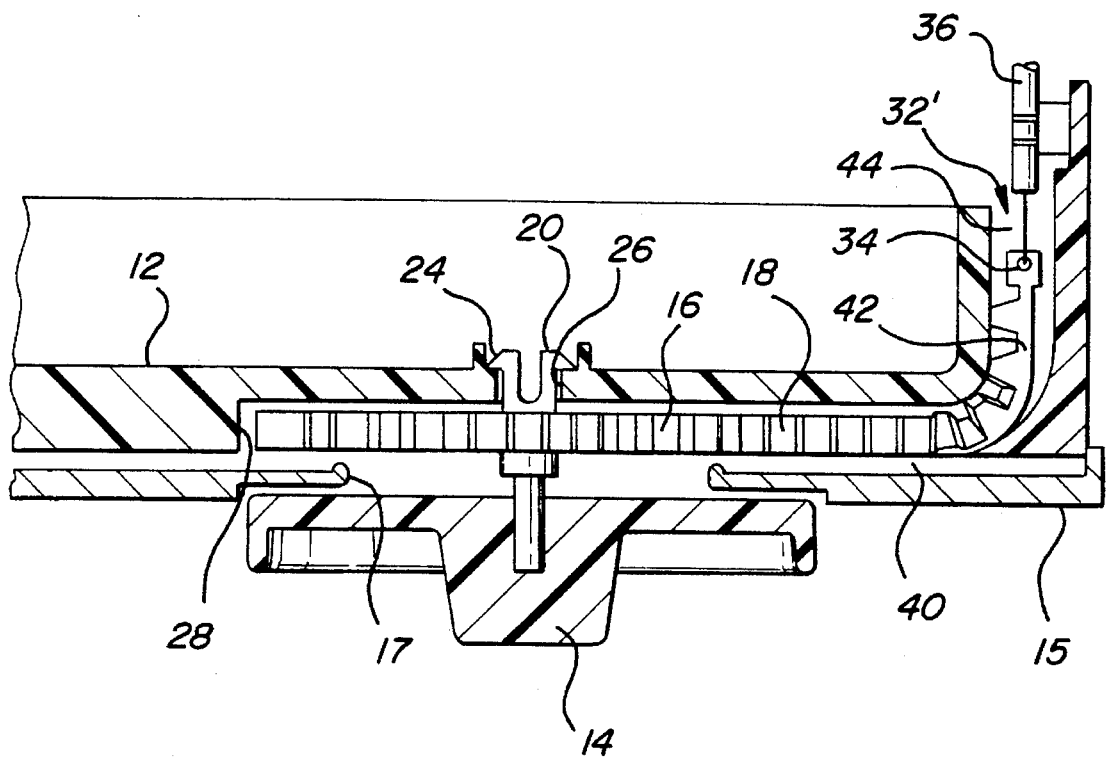
FIG. 3 is a cross section of another rotary drive mechanism including the gear and rack of FIG. 1.

In the embodiment of FIG. 3, the gear and rack 10 30 is the same as in FIG. 2 and the housing 12 is the same except that the channel 32' is extended and curved so that the motion of the free end is transverse to the gear tangent. The channel consists of a first run 40 tangent to the gear 16, a curve 42 coupled to the first run 40, and a final run 44 extending transverse to the first run. The curve 42 changes the path direction by about 90 degrees so that the final run is parallel to the gear axis. The free portion 30 of the rack extends through the first run 40 and the curve 42 to the final run 44. The free end 34 then will move along the final run as the knob 14 is turned.

While the final run 44 is depicted as parallel to the gear axis, the curve can be turned in another direction according to the desired attitude of the final run. Generally this is determined by the location of the Bowden wire or other control device operated by the actuator. The final run need be only approximately linear and in fact may advantageously be arcuate. This would be appropriate where the controlled member is a lever arm coupled to the free end 34.

Figure 4:
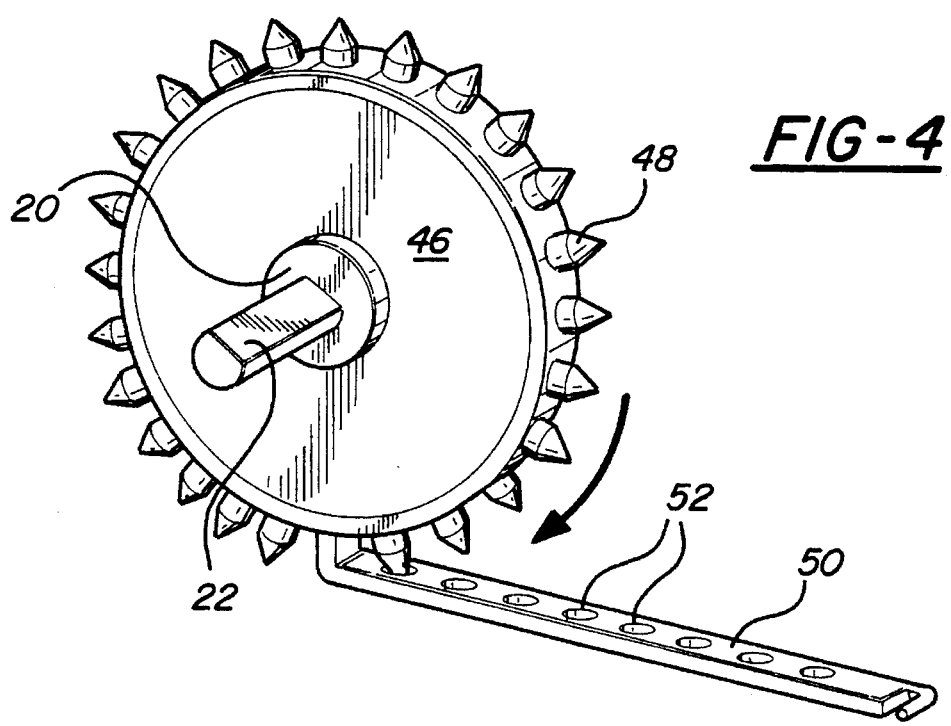
FIG. 4 is an isometric view of a modified gear and rack mechanism according to another embodiment of the invention.

The integral gear and rack embodiment of FIG. 4 can be substituted for that of FIG. 2. The gear 46 is a sprocket having a hub 20, shaft 22, and pointed pins or teeth 48. The rack 50 is attached to the sprocket periphery and has holes 52 to mate with the teeth 48 for driving the rack during sprocket rotation.

The drive mechanism using the integral gear and rack has fewer parts than comparable devices of conventional construction and is simpler to assemble and less expensive to manufacture.

The embodiments of the invention in which an exclusive property or privilege is claimed are defined as follows:

1. A drive mechanism for translating rotary motion to substantially linear motion comprising:

a one-piece molding comprising a gear and a flexible rack such that the rack is driven by the gear and the rack can wrap around the gear and unwrap;

the rack having one end connected to the gear and a free end;

means for mounting the gear for rotation about an axis; and a guide for guiding the free end in a path, whereby the free end follows the path upon gear rotation.

2. The invention as defined in claim 1 wherein the means for mounting the gear comprises a hub on the gear axis and a housing for rotatably supporting the hub.

3. The invention as defined in claim 1 wherein:

the means for mounting the gear comprises a hub on the gear axis and a housing for rotatably supporting the hub; and an actuator is attached to the gear for operating the drive mechanism.

4. The invention as defined in claim 1 wherein the path is linear and the guide comprises a channel for constraining the rack to the path.

5. The invention as defined in claim 1 wherein:

the guide comprises a channel for constraining the rack to the path; and the path comprises a run transverse to the axis, a run substantially parallel to the axis, and a curve connecting the runs so that the free end of the rack can move substantially parallel to the gear axis as the one end of the rack moves around the axis.

6. The invention as defined in claim 1 wherein:

the guide comprises a channel for constraining the rack to the path; and the path is curved from a first run tangential to the gear to a run transverse to the first run, so that the free end of the rack can move transverse to the first run when one end of the rack moves around the axis.

7. The invention as defined in claim 1 wherein the gear has gear teeth extending across the width of the gear, and the rack has a toothed surface for meshing with the gear teeth whereby the gear drives the rack according to gear rotation.

8. The invention as defined in claim 1 wherein the gear comprises a sprocket having pointed teeth, and the rack has a row of holes for meshing with the sprocket teeth whereby the gear drives the rack according to gear rotation.

\* \* \* \* \*